United States Patent
Zhou et al.

(10) Patent No.: US 8,659,679 B2
(45) Date of Patent: Feb. 25, 2014

(54) HARDWARE-CONSTRAINED TRANSFORMS FOR VIDEO STABILIZATION PROCESSES

(75) Inventors: Jianping Zhou, Fremont, CA (US); Christopher L. Mills, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 43 days.

(21) Appl. No.: 13/586,031

(22) Filed: Aug. 15, 2012

(65) Prior Publication Data
US 2013/0329066 A1 Dec. 12, 2013

Related U.S. Application Data

(60) Provisional application No. 61/657,638, filed on Jun. 8, 2012.

(51) Int. Cl.
*H04N 5/76* (2006.01)
*H04N 5/228* (2006.01)
*H04N 7/12* (2006.01)
*G06K 9/00* (2006.01)

(52) U.S. Cl.
USPC ............... 348/231.99; 348/208.99; 348/296; 348/231.4; 348/231.2; 348/231.3; 375/240.05; 382/103; 382/107

(58) Field of Classification Search
USPC ............... 348/208.99, 208.6, 231.99, 231.1, 348/231.2, 231.3, 296; 375/240.05; 382/103, 107
See application file for complete search history.

(56) References Cited

U.S. PATENT DOCUMENTS

| | | | |
|---|---|---|---|
| 6,028,608 A * | 2/2000 | Jenkins | 345/619 |
| 6,430,222 B1 | 8/2002 | Okada | |
| 2006/0120615 A1 | 6/2006 | Wang et al. | |
| 2009/0080798 A1 | 3/2009 | Maurer et al. | |
| 2009/0160957 A1 * | 6/2009 | Deng et al. | 348/208.99 |

* cited by examiner

*Primary Examiner* — Tuan Ho
*Assistant Examiner* — Marly Camargo
(74) *Attorney, Agent, or Firm* — Kenyon & Kenyon, LLP

(57) ABSTRACT

The video stabilization method can generate output data for an output frame from input data of an input frame according to a perspective transform of a transform matrix. The input data used for the perspective transform can be obtained from a buffer of a predetermined depth. The transform matrix can be altered when the input data required for the transform exceeds the depth of the buffer.

22 Claims, 3 Drawing Sheets

100

200

300

400

500

HARDWARE-CONSTRAINED TRANSFORMS FOR VIDEO STABILIZATION PROCESSES

PRIORITY CLAIM

The present application claims priority to U.S. Provisional Application No. 61/657,638, filed on Jun. 8, 2012, the entirety of which is incorporated by reference herein.

BACKGROUND

Many consumer electronic devices have camera systems that capture video data locally for storage or for delivery to other devices. The designs of the electronic devices may vary but, generally, the devices will include central processing units (CPUs) and/or graphical processing units (GPUs), memory systems, and programming constructs such as operating systems and applications to manage the device's operation.

A camera system generally includes an image sensor and an image signal processor (ISP). The image sensor may generate an output video signal from incident light. The ISP may apply various processing operations to the video from the image sensor, including noise reduction, demosaicing, white balancing, filtering, and color enhancement. The ISP is a dedicated integrated circuit that performs such processes in a pipelined processing system and, therefore, the ISP can perform such functions faster than a CPU or GPU could perform them.

Video stabilization techniques are processes performed on video to eliminate distortion created by shaking hands of camera operators. To perform video stabilization, a consumer device estimates the handshake and then processes video frames according to a transform that inverts distortion created by the handshake. Video sequences typically involve high data rates, for example HD 1080p at 30 frames per second and, therefore, stabilization transforms consume a lot of processor cycles and power when performed by a CPU or GPU.

BRIEF DESCRIPTION OF THE DRAWINGS

So that features of the present invention can be understood, a number of drawings are described below. It is to be noted, however, that the appended drawings illustrate only particular embodiments of the invention and are therefore not to be considered limiting of its scope, for the invention may encompass other equally effective embodiments.

DETAILED DESCRIPTION

Embodiments of the present invention provide techniques for stabilizing frames of a video sequence in which the video stabilization transform to be applied to a frame is limited based on whether the transform requires input data in excess of the available hardware capacity.

Video stabilization may be performed in a pipelined stage of an ISP to boost performance and to save power. An ISP, however, has limited data storage, typically only a few rows of a frame. According to an embodiment, an ISP may estimate, from transform data that represents a video stabilization transform to be applied to frame data, whether the transform requires input data in excess of capacity of available ISP storage. If so, the ISP may alter transform coefficient(s) to fit the transform to the limited storage of the ISP.

According to an embodiment, the video stabilization method can generate output data for an output frame from input data of an input frame according to a perspective transform of a transform matrix. The input data used for the perspective transform can be obtained from a buffer. The transform matrix can be altered such that input data required for the transform is limited to the input data in the buffer.

Figure 1:
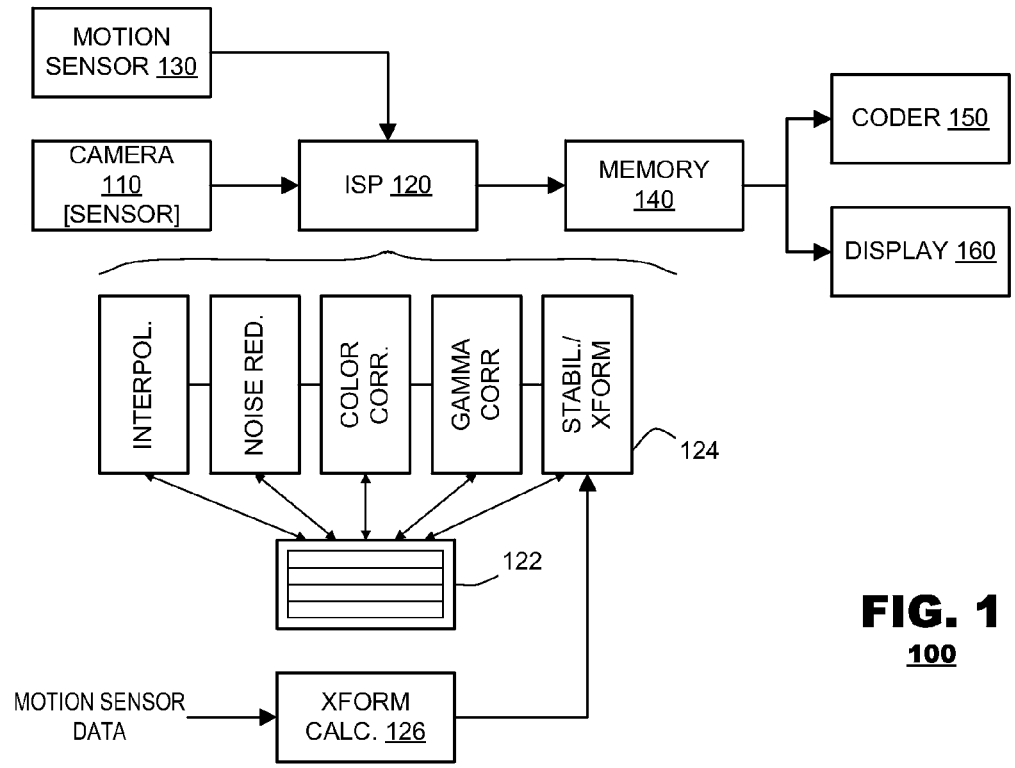
FIG. 1 is a simplified block diagram of an image capture system according to an embodiment of the present invention.

FIG. 1 is a simplified block diagram of an image capture system 100 according to an embodiment of the present invention. The system 100 may include an image signal processor (ISP) 120 to perform video stabilization processes on an input frame. The video stabilization may apply a perspective transform to an available portion of the input frame in the ISP 120 using a transform matrix. The amount of the input frame that is available to have the perspective transform applied may be limited by the hardware of the ISP 120. For example, the memory in the ISP 120 may store a limited amount (e.g., number of lines) of the input frame at a given time. The transform matrix may be altered if the data of the input frame that is needed for the transform exceeds the available portion of the input frame in the ISP 120.

The system 100 also may include a camera 110, a motion sensor 130, memory system 140 and downstream processing stage(s), such as a video coder 150 and/or a display device 160. The camera 110 may capture image data of a local environment and provide image data to the ISP 120. The ISP 120 may perform image processing operations on the image data to improve perceptual quality of the image data. It may output processed image data to the memory 140 for later consumption by the downstream processing devices. For example, as part of its operation, the ISP 120 may apply video stabilization processes to the input image data using motion information provided by the motion sensor 130. The image data output by the ISP 120 may form the basis of subsequent processes performed by the image capture system 100.

FIG. 1 also provides a simplified block diagram of an ISP 120 according to an embodiment of the present invention. The ISP 120 typically is an integrated circuit that includes hardware processing units devoted to discrete image processing tasks. In the example illustrated in FIG. 1, the ISP 120 includes processing stages directed to Bayer interpolation, noise reduction, color correction, gamma correction and image scaling. In general, ISPs 120 may have additional stages devoted to other processing tasks.

The ISP 120 may include a buffer memory 122 sufficient to store a predetermined number N of rows of image data output by the camera 110. The buffer memory 122 typically is insufficient to store an entire frame of image data.

According to an embodiment of the present invention, an ISP 120 may apply video stabilization processes to image data. To that end, the ISP 120 may include a stabilization unit 124 that may access buffer memory 122. The ISP 120 also may include a transform calculator 126 that may provide stabilization transforms to be used by the stabilization unit 124. In one implementation, stabilization transforms may be derived from motion sensor data that indicate a camera's orientation as it captures each frame of a video sequence. For example, the stabilization transforms may be derived by any of the techniques disclosed in the inventors' co-pending applications, "Motion-based Video Stabilization," Ser. No. 13/210,060, filed Aug. 15, 2011 and "Rolling Shutter Reduction Based on Motion Sensors," Ser. No. 13/209,899, filed Aug. 15, 2011, the disclosures of which are incorporated herein in their entirety.

Stabilization transforms may represent mathematical transforms to be performed to derive pixel values at each location (x,y) in an output frame from pixel values at locations (x',y') in the input frame. The transform may take the following form:

$$\begin{pmatrix} x^* \\ y^* \\ z^* \end{pmatrix} = V \cdot p = \begin{pmatrix} v_0 & v_1 & v_2 \\ v_3 & v_4 & v_5 \\ v_6 & v_7 & v_8 \end{pmatrix} \cdot \begin{pmatrix} x \\ y \\ 1 \end{pmatrix}, \quad \text{Eq. 1}$$

$$x' = \frac{x^*}{z^*} = \frac{v_0 \cdot x + v_1 \cdot y + v_2}{v_6 \cdot x + v_7 \cdot y + v_8}, \text{ and} \quad \text{Eq. 2}$$

$$y' = \frac{y^*}{z^*} = \frac{v_3 \cdot x + v_4 \cdot y + v_5}{v_6 \cdot x + v_7 \cdot y + v_8}, \text{ where} \quad \text{Eq. 3}$$

V represents the transform matrix, which is populated by transform coefficients $v_0$-$v_8$ and $x^*$, $y^*$, $z^*$ represent intermediate transform results.

Operation of the transform calculator 126 may be tuned to operational characteristics of a sensor within the camera 110. For sensors that apply global motion shutters, the transform calculator 126 may generate a single transform per frame. For other sensors that apply rolling shutters, the transform calculator 126 may generate a transform for each row of data output by the camera 110.

In some situations, a transform calculator 126 may generate a transform matrix V that calls for a larger array of data than may be available to the stabilizer unit 124. For example, if a buffer memory 122 has sufficient capacity to store only N rows of image data, a transform matrix V may require access to some number of rows of image data in excess of N. According to an embodiment, the stabilizer unit 124 may detect when the transform matrix V exceeds the capacity of the buffer memory 122 and may revise the matrix V to fit the storage limitations of the memory 122.

Figure 2:
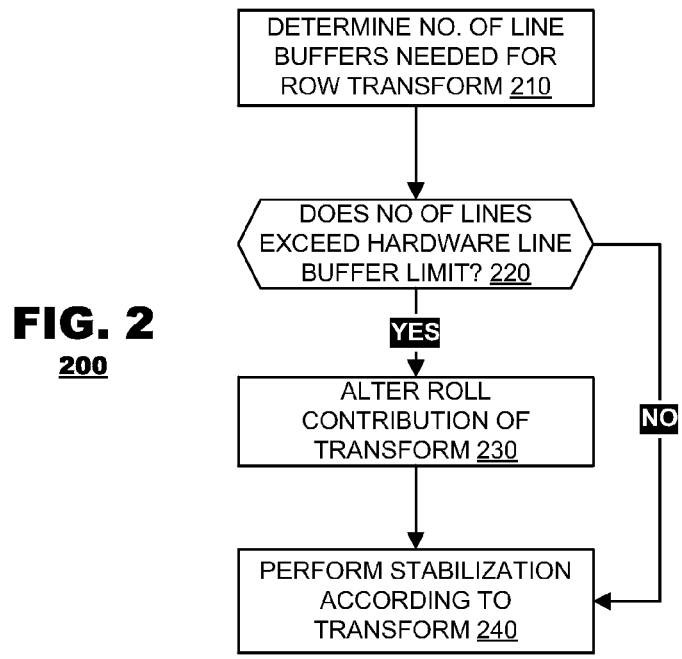
FIG. 2 illustrates a method for performing video stabilization according to an embodiment of the present invention.

FIG. 2 illustrates a method 200 for performing video stabilization according to an embodiment of the present invention. The method may be used to alter the transform matrix V if it is determined that the range of rows needed for the transform exceeds the hardware constraints of the ISP. In an embodiment, it may be determined if a range of row data needed for the transform is in excess of the number of rows available in the memory.

According to the method, when the stabilizer unit 124 receives a transform matrix V, the stabilization unit 124 may determine a number of rows of image data needed to perform row transforms according to the matrix V (box 210). It may determine whether the number of rows that are needed exceed a storage capacity of the buffer memory (box 220). If so, the stabilization unit 124 may alter a roll contribution of the transform matrix V to fit the matrix V to the storage limitations of the buffer memory 122 (box 230). After the transform is altered or if the number of rows that are needed under the original transform do not exceed the storage capacity of the buffer, the method may perform stabilization (box 240).

Adjustment of the roll component may involve adjustment of the $v_3$ component of the transform matrix V (see Eq. 4). The $v_3$ component essentially determines, for each row y in the output matrix, a range of rows $y_1'$-$y_2'$ in an input image that contribute to pixel values at the respective output row y. When an original transform matrix V causes the stabilization unit 124 to look back to a range of row data in excess of the number of rows stored by the buffer memory 122, the $v_3$ component may be reduced accordingly.

Figure 3:
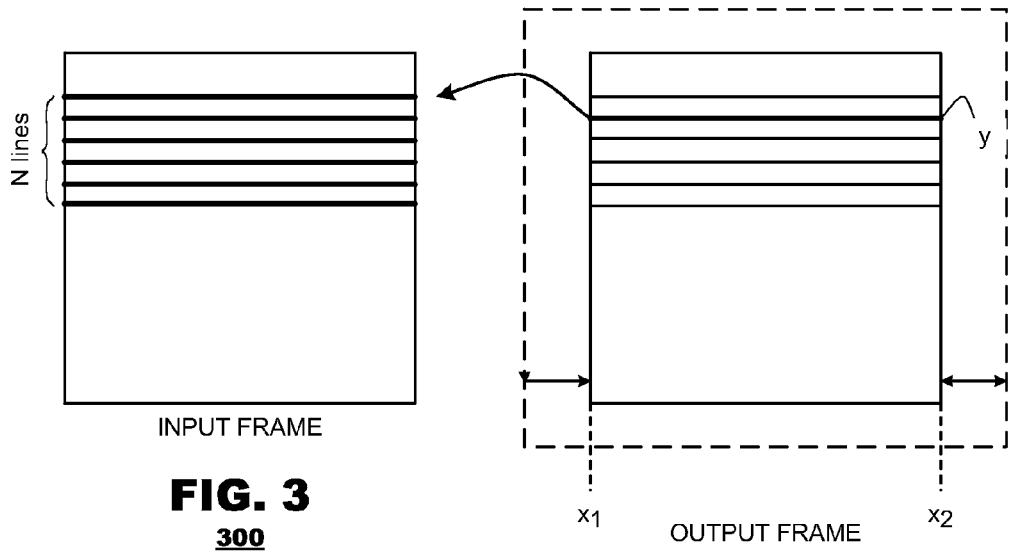
FIG. 3 illustrates exemplary relationships of image data between an input frame and an output frame.

FIG. 3 illustrates exemplary relationships of image data between an input frame and an output frame. As illustrated, a given row y in an output frame maps back to an input frame according to Eq. 3. The number of lines of the input frame that are needed to represent row y may be determined by mappings of pixel locations $x_1$ and $x_2$ of the output frame at end points of the row y.

According to an embodiment of the present invention, as discussed below, given coordinates ($x_1$,y) and ($x_2$,y) representing end points of the row y in the output frame, the system may calculate a range of rows in an input image needed to calculate the end points. The system may alter an input transform V if the range of rows exceeds the hardware constraints of the ISP.

Figure 4:
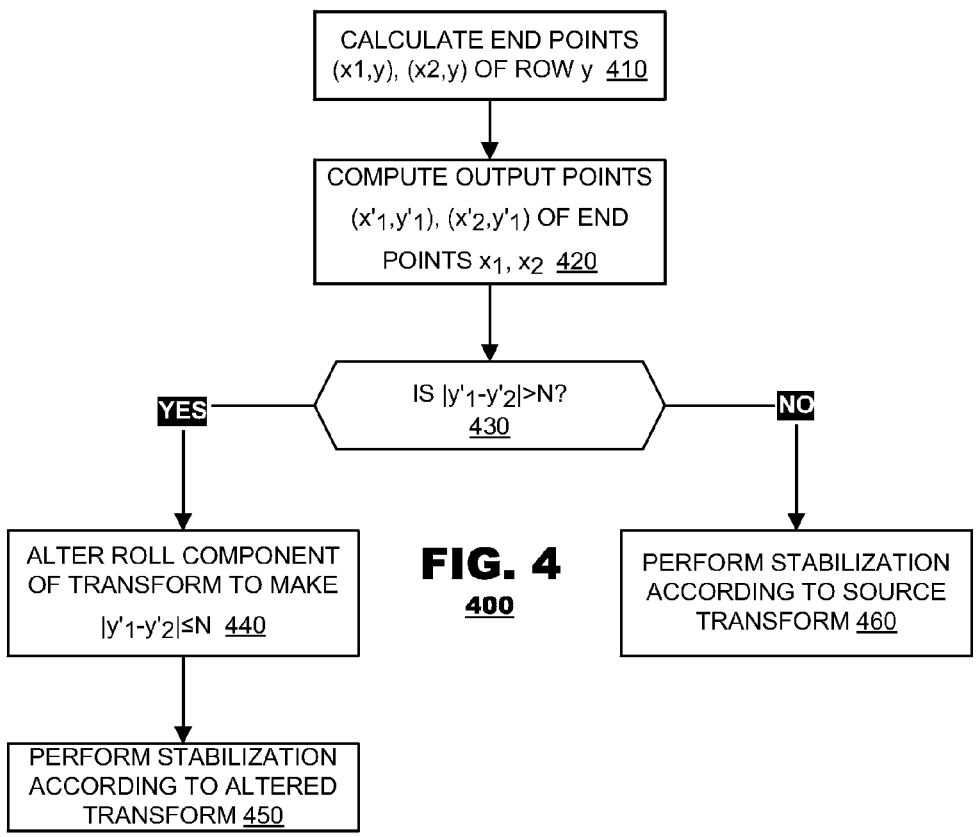
FIG. 4 illustrates another method for performing video stabilization according to an embodiment of the present invention.

FIG. 4 illustrates another method 400 for performing video stabilization according to an embodiment of the present invention. The method 400 may operate on a row-by-row basis. At each row y in an output image, the method 400 may calculate end points $x_1$, $x_2$ of the row y (box 410). The method 400 then may calculate mapping coordinates of the end points ($x_1$,y), ($x_2$,y) in the output image according to Eq. 3, represented as ($x'_1$, $y'_1$), ($x'_2$, $y'_2$) (box 420). The method 400 may compare $y'_1$ to $y'_2$ to determine whether they differ by more than N rows (box 430). If so, the method 400 may alter a roll component of the transform V to satisfy the relation $|y'_1 - y'_2| \leq N$ (box 440). Thereafter, the method 400 may perform stabilization according to the altered transform (box 450). N rows may represent the number of rows of the image available to be processed (e.g., capacity of buffer memory).

In one embodiment, to adjust the roll component, the method 400 may alter $y'_1$ or $y'_2$ to set $|y'_1 - y'_2| = N$. Specifically, if $y'_2$ is larger than $y'_1$, the method 400 may set $y'_2 = y'_1 + N$ and solve for $v'_3$ according to:

$$\frac{v'_3 \cdot x_2 + v_4 \cdot y + v_5}{v_6 \cdot x_2 + v_7 \cdot y + v_8} = \frac{v'_3 \cdot x_1 + v_4 \cdot y + v_5}{v_6 \cdot x_1 + v_7 \cdot y + v_8} + N \quad \text{Eq. 5}$$

Alternatively, if $y'_1$ is larger than $y'_2$, the method 400 may set $y'_1 = y'_2 + N$ and solve for $v'_3$ according to:

$$\frac{v'_3 \cdot x_1 + v_4 \cdot y + v_5}{v_6 \cdot x_1 + v_7 \cdot y + v_8} = \frac{v'_3 \cdot x_2 + v_4 \cdot y + v_5}{v_6 \cdot x_2 + v_7 \cdot y + v_8} + N \quad \text{Eq. 6}$$

In both events, the foregoing equations represent a single equation and a single unknown. The coefficients $v_4$-$v_8$, row number y and hardware limit N are values that are available to the system.

Following operation of box 440, the method 400 may generate an altered transform V' as follows:

$$\begin{pmatrix} x^* \\ y^* \\ z^* \end{pmatrix} = V' \cdot p = \begin{pmatrix} v_0 & v_1 & v_2 \\ v'_3 & v_4 & v_5 \\ v_6 & v_7 & v_8 \end{pmatrix} \cdot \begin{pmatrix} x \\ y \\ 1 \end{pmatrix}. \quad \text{Eq. 7}$$

$$x' = \frac{x^*}{z^*} = \frac{v_0 \cdot x + v_1 \cdot y + v_2}{v_6 \cdot x + v_7 \cdot y + v_8} \quad \text{Eq. 8}$$

$$y' = \frac{y^*}{z^*} = \frac{v'_3 \cdot x + v_4 \cdot y + v_5}{v_6 \cdot x + v_7 \cdot y + v_8} \quad \text{Eq. 9}$$

Thus, the altered transform V' may be determined such that the image data needed for the transform does not exceed the image data that is available in the memory of the ISP.

Figure 5:
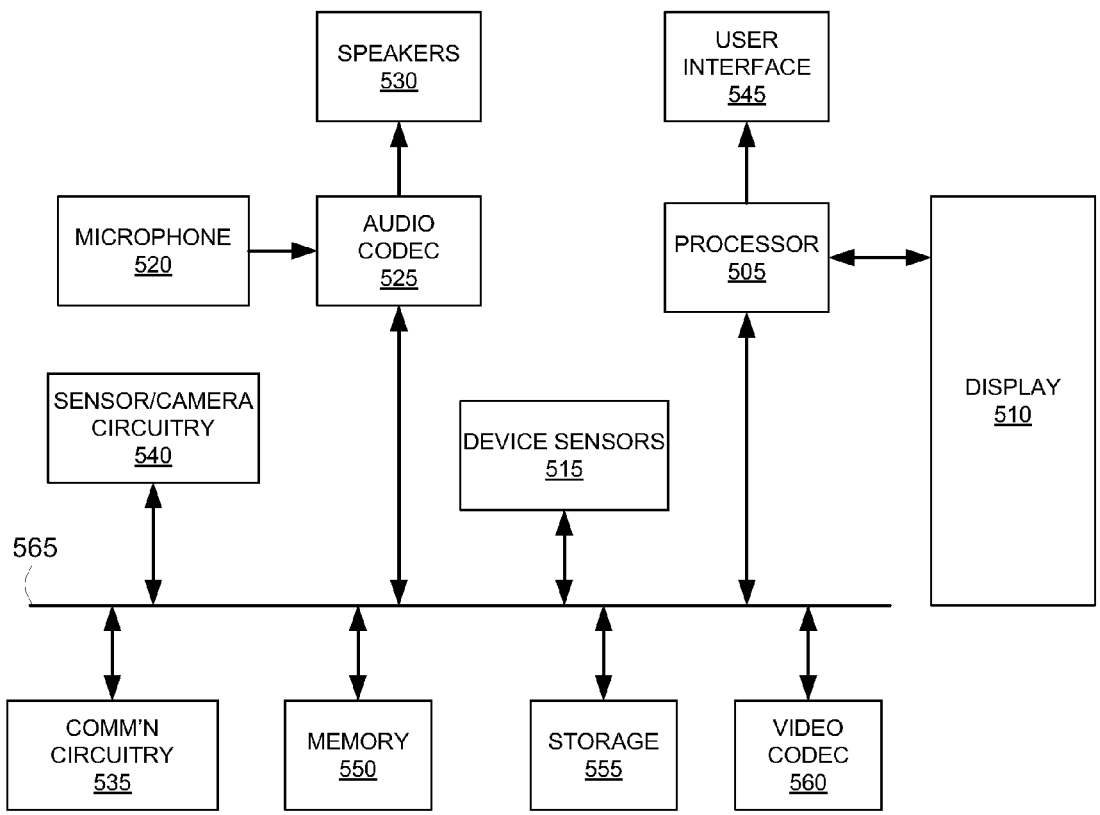
FIG. 5 is a simplified functional block diagram of a representative electronic device incorporating digital video capture capability according to an embodiment.

FIG. 5 is a simplified functional block diagram of representative electronic device 500 incorporating digital video capture capability is shown according to an embodiment. The electronic device 500 may include processor 505, display 510, device sensors 515 (e.g., gyro, accelerometer, proximity, and ambient light sensors), microphone 520, audio codec 525, speaker 530, communications circuitry 535, image sensor with associated camera and video hardware 540, user interface 545, memory 550, storage device 555, video codec(s) 560 and communications bus 565.

The processor 505 may be a programmable control device, a general- or special-purpose processor or an integrated circuit. The processor 505 may execute instructions necessary to carry out or control the operation of many functions, such as the generation and/or processing of image metadata, as well as other functions performed by electronic device 500. Processor 505 may for instance drive display 510 and may receive user input from user interface 545. Processor 505 also may be, for example, a system-on-chip such as an application's processor such as those found in mobile devices or a dedicated graphics processing unit (GPU). Processor 505 may be based on reduced instruction-set computer (RISC) or complex instruction-set computer (CISC) architectures or any other suitable architecture and may include one or more processing cores.

The memory 550 may include one or more different types of storage media used by processor 505 to perform device functions. Memory 550 may include, for example, cache, read-only memory (ROM), and/or random access memory (RAM). Communications bus 560 may provide a data transfer path for transferring data to, from, or between at least storage device 555, memory 550, processor 505, and camera circuitry 540. User interface 545 may allow a user to interact with electronic device 500. For example, user interface 545 can take a variety of forms, such as a button, keypad, dial, a click wheel, or a touch screen.

The non-transitory storage device 555 may store media (e.g., image and video files), computer program instructions or software, preference information, device profile information, and any other suitable data. The storage device 555 may include one more storage mediums including, for example, magnetic disks (fixed, floppy, and removable) and tape, optical media such as CD-ROMs and digital video disks (DVDs), and semiconductor memory devices such as Electrically Programmable Read Only Memory (EPROM), and Electrically Erasable Programmable Read-Only Memory (EEPROM).

The video codec 560 may be a hardware device, a software module or a combination of hardware and software that enables video compression and/or decompression of digital video. For example, video codec 560 may implement the H.264 video standard. Communications bus 565 may be any one or more communication paths and employ any technology or combination thereof that is appropriate for the particular implementation.

Software may be organized into one or more modules and be written in any suitable computer programming language (or more than one language). When executed by, for example, processor 505 such computer program code or software may implement one or more of the methods described herein.

Various changes in the materials, components, circuit elements, as well as in the details of the illustrated operational methods are possible without departing from the scope of the following claims. For instance, processor 505 may be implemented using two or more program control devices communicatively coupled. Each program control device may include the above-cited processors, special purpose processors or custom designed state machines that may be embodied in a hardware device such as an application specific integrated circuit (ASIC) or a field programmable gate array (FPGA). In addition, the techniques disclosed herein may be applied to previously captured video sequences, providing the necessary metadata has been captured for each video frame.

In the above description, for purposes of explanation, numerous specific details have been set forth in order to provide a thorough understanding of the inventive concepts. As part of this description, some structures and devices may have been shown in block diagram form in order to avoid obscuring the invention. Reference in the specification to "one embodiment" or "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

It will be appreciated that in the development of any actual implementation (as in any development project), numerous decisions must be made to achieve the developers' specific goals (e.g., compliance with system and business related constraints), and that these goals will vary from one implementation to another. It will also be appreciated that such development efforts might be complex and time consuming, but would nevertheless be a routine undertaking for those of ordinary skill in the digital video capture and processing field having the benefit of this disclosure.

Although the processes illustrated and described herein include series of steps, it will be appreciated that the different embodiments of the present disclosure are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

It is to be understood that the above description is intended to be illustrative, and not restrictive. For example, the above described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

We claim:

1. A video stabilization method, comprising:
generating output data for an output frame from input data of an input frame according to a perspective transform of a transform matrix, wherein the input data used for the perspective transform is obtained from a buffer of a predetermined depth; and
altering the transform matrix when a range of input data required for the transform exceeds the depth of the buffer, wherein altering the transform matrix includes altering a roll coefficient of the transform matrix.

2. The video stabilization method of claim 1, wherein the input data in the buffer is a portion of input frame data.

3. The video stabilization method of claim 1, wherein altering the transform matrix when the range of the input data required for the transform exceeds the depth of the buffer includes:
  determining a number of rows needed from the input frame to perform a transformation of a row of the output image using the transform matrix; and
  adjusting the transform matrix such that the numbed of rows needed from the input frame does not exceed a number of rows in the buffer.

4. The video stabilization method of claim 1, further comprising:
  determining input frame motion using camera motion data; and
  estimating the transform matrix based on the input frame motion.

5. The video stabilization method of claim 1, further comprising deriving the transform matrix from motion sensor data.

6. The video stabilization method of claim 1, wherein the transform matrix is applied per row of the input frame.

7. The video stabilization method of claim 1, wherein the transform matrix is applied per frame of the image sequence.

8. A non-transitory computer-readable medium storing computer-executable instructions that, when executed, cause a computer to execute a method comprising:
  generating output data for an output frame from input data of an input frame according to a perspective transform of a transform matrix, wherein the input data used for the perspective transform is obtained from a buffer of a predetermined depth; and
  altering the transform matrix when a range of input data required for the transform exceeds the depth of the buffer, wherein altering the transform matrix includes altering a roll coefficient of the transform matrix.

9. The non-transitory computer-readable medium of claim 8, wherein altering the transform matrix when the range of the input data required for the transform exceeds the depth of the buffer includes:
  determining a number of rows needed from the input frame to perform a transformation of a row of the output image using the transform matrix; and
  adjusting the transform matrix such that the numbed of rows needed from the input frame does not exceed a number of rows in the buffer.

10. A method for determining a transform matrix for video processing, comprising:
  calculating an initial transform matrix to correct for motion of a video frame;
  determining a number of lines of the frame needed for row transformation using the initial transform matrix;
  comparing a number of lines of the frame available for the row transformation to the number of lines of the frame needed for the row transformation using the initial transform matrix; and
  revising the initial transform matrix, if it is determined that the number of lines available for the row transformation is less than the number of lines of the frame needed for the row transformation, wherein revising the transform matrix includes altering a roll coefficient of the transform matrix.

11. The method of claim 10, wherein altering the transform matrix includes altering only one coefficient of the transform matrix.

12. The method of claim 10, wherein the number of lines of the frame available for the row transformation is a number of lines stored in a buffer.

13. The method of claim 10, wherein determining the number of lines of the frame needed for the row transformation using the initial transform matrix includes:
  applying the initial transform matrix to end points of one row of an output frame to determine mapping coordinates of the end points in the input frame; and
  finding a difference between y-coordinates of the mapped end points of the row, the difference corresponding to the number of lines of the frame needed for the row transformation.

14. A video stabilization method, comprising:
  obtaining motion data corresponding to motion of a camera;
  computing motion of a camera for a current frame of a video sequence;
  estimating a transform matrix to correct for the motion of the current frame storing a part of the current frame information to a frame buffer having a capacity less than a capacity sufficient to store the entire current frame;
  determining whether the transform matrix requires input data in excess of the capacity of the frame buffer;
  altering the transform matrix, if it is determined that the transform matrix requires input data in excess of the capacity of the frame buffer, wherein altering the transform matrix includes altering a roll coefficient of the transform matrix.

15. The video stabilization method of claim 14, wherein determining whether the transform matrix requires input data in excess of the capacity of the frame buffer includes determining whether a number of rows of the input image needed for the transform exceeds a number of rows of the input image stored in the frame buffer.

16. The video stabilization method of claim 14, wherein the transform matrix is altered such that the transform matrix maps a row of an output image to a number of rows of the input image stored in the frame buffer.

17. An apparatus comprising:
  a camera to capture a video sequence;
  a buffer to store a portion of a frame of the video sequence; and
  a controller configured to:
  compute motion of the camera for the frame;
  calculate a transform matrix to correct for the motion of the camera;
  determine a portion of the frame needed for the transform using the transform matrix; and
  alter the transform matrix, such that the portion of the frame needed for the transform is limited to the portion of a frame stored in the buffer, wherein altering the transform matrix includes altering a roll coefficient of the transform matrix.

18. The apparatus of claim 17, wherein determining the portion of the frame needed for the transform includes mapping a row of an output frame to one or more rows of the input frame using the transform matrix.

19. The apparatus of claim 17, further comprising a motion sensor configured to provide motion data for the camera, wherein the motion data is used to compute the motion of the camera for the frame.

20. A chip comprising:
  a buffer to store a portion of a frame of the video sequence; and
  a stabilizer unit configured to determine a portion of the frame needed for a transform using a stabilization transform, and configured to alter the stabilization transform, such that the portion of the frame needed for the transform is limited to the portion of a frame stored in the buffer, wherein altering the stabilization transform includes altering a roll coefficient of the stabilization transform.

21. The chip of claim 20, further comprising a transform calculator to determine the stabilization transform using motion sensor data.

22. The chip of claim 20, wherein the buffer has a capacity less than a capacity sufficient to store the entire current frame.

* * * * *

UNITED STATES PATENT AND TRADEMARK OFFICE
CERTIFICATE OF CORRECTION

| | |
|---|---|
| PATENT NO. | : 8,659,679 B2 |
| APPLICATION NO. | : 13/586031 |
| DATED | : February 25, 2014 |
| INVENTOR(S) | : Jianping Zhou et al. |

It is certified that error appears in the above-identified patent and that said Letters Patent is hereby corrected as shown below:

In the Claims

Column 7, line 10, Claim 3, please change:

"the numbed" to --the number--;

Column 8, line 45, Claim 8, please change:

"the numbed" to --the number--.

Signed and Sealed this
Eleventh Day of November, 2014

Michelle K. Lee
*Deputy Director of the United States Patent and Trademark Office*